US010512887B2

(12) United States Patent
Forstpointner et al.

(10) Patent No.: US 10,512,887 B2
(45) Date of Patent: Dec. 24, 2019

(54) FLUIDIZED BED REACTOR WITH PINCHING FITTINGS FOR PRODUCING POLYSILICON GRANULATE, AND METHOD AND USE FOR SAME

(71) Applicant: Wacker Chemie AG, Munich (DE)

(72) Inventors: Gerhard Forstpointner, Kastl (DE); Bernhard Baumann, Emmerting (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/087,416

(22) PCT Filed: Mar. 1, 2017

(86) PCT No.: PCT/EP2017/054754
§ 371 (c)(1),
(2) Date: Sep. 21, 2018

(87) PCT Pub. No.: WO2017/162414
PCT Pub. Date: Sep. 28, 2017

(65) Prior Publication Data
US 2019/0099730 A1 Apr. 4, 2019

(30) Foreign Application Priority Data
Mar. 21, 2016 (DE) ........................ 10 2016 204 651

(51) Int. Cl.
*B01J 8/00* (2006.01)
*B01J 8/18* (2006.01)
*C01B 33/027* (2006.01)
*F16K 7/04* (2006.01)
*B01J 19/02* (2006.01)

(52) U.S. Cl.
CPC ............ *B01J 8/0035* (2013.01); *B01J 8/0015* (2013.01); *B01J 8/1827* (2013.01); *B01J 8/1872* (2013.01); *B01J 19/02* (2013.01); *C01B 33/027* (2013.01); *F16K 7/04* (2013.01); *B01J 2208/00548* (2013.01); *B01J 2208/00752* (2013.01); *B01J 2208/00761* (2013.01); *B01J 2208/00769* (2013.01); *B01J 2208/00796* (2013.01); *B01J 2219/0245* (2013.01); *B01J 2219/0295* (2013.01)

(58) Field of Classification Search
CPC ...... B01J 8/0035; B01J 8/1872; C01B 33/027
USPC ....................................................... 422/129
See application file for complete search history.

(56) References Cited

U.S. PATENT DOCUMENTS

| 4,111,335 A * | 9/1978 | Arya ..................... G01G 15/001 141/105 |
| 4,132,382 A * | 1/1979 | Jackson .................... F16K 7/07 138/109 |
| 4,372,528 A * | 2/1983 | Raftis ....................... F16K 7/04 251/127 |
| 4,786,477 A | 11/1988 | Yoon et al. |
| 4,883,687 A * | 11/1989 | Gautreaux ................. B01J 8/26 427/213 |
| 5,992,818 A * | 11/1999 | Jones ..................... F16K 7/061 251/358 |
| 6,083,001 A * | 7/2000 | Deardon ................... B24C 7/00 433/88 |
| 6,412,756 B1 | 7/2002 | Hayduk |
| 2007/0095945 A1* | 5/2007 | Keudell ............... B05B 7/1459 239/398 |
| 2008/0299291 A1 | 12/2008 | Weidhaus et al. |
| 2011/0001076 A1 | 1/2011 | Sidler |
| 2011/0114868 A1* | 5/2011 | Warren ..................... B32B 7/12 251/331 |
| 2013/0216466 A1 | 8/2013 | Traunspurger et al. |
| 2015/0104369 A1 | 4/2015 | Geertsen |
| 2016/0101982 A1 | 4/2016 | Pedron et al. |
| 2016/0107894 A1 | 4/2016 | Pedron |
| 2016/0236940 A1 | 8/2016 | Weckesser et al. |
| 2016/0326001 A1 | 11/2016 | Hauswirth et al. |
| 2017/0120210 A1 | 5/2017 | Weckesser |

FOREIGN PATENT DOCUMENTS

| DE | 199 49 577 C2 | 5/2010 |
| DE | 10 2012 202 640 A1 | 8/2013 |
| EP | 1211334 A1 | 6/2002 |
| EP | 1 990 314 A2 | 11/2008 |
| EP | 2 270 371 A2 | 1/2011 |
| WO | 2014177377 A2 | 11/2014 |
| WO | 2014180693 A1 | 11/2014 |
| WO | 2014191274 A1 | 12/2014 |
| WO | 2015104127 A1 | 7/2015 |
| WO | 2015140028 A1 | 9/2015 |
| WO | 2017162414 A1 | 9/2017 |

OTHER PUBLICATIONS

KGK Kautschuk Gummi Kunststoffe, "Elastomers and Plastics," vol. 55, Nr. Jun. 2002.
Technoprolil TP Blau GmbH, Sep. 2013.

* cited by examiner

*Primary Examiner* — Huy Tram Nguyen
(74) *Attorney, Agent, or Firm* — Brooks Kushman P.C.

(57) ABSTRACT

Control of the flow of granular polysilicon granules is effected by employing an elastomeric pinch sleeve valve. The flow control by this method is especially useful for controlling the flow of silicon seed particles and granular polysilicon product in the fluidized bed method for producing polysilicon. The flow may be stopped without gas leakage, and is suitable for use over long operating campaigns.

15 Claims, 2 Drawing Sheets

FLUIDIZED BED REACTOR WITH PINCHING FITTINGS FOR PRODUCING POLYSILICON GRANULATE, AND METHOD AND USE FOR SAME

CROSS REFERENCE TO RELATED APPLICATIONS

This application is the U.S. National Phase of PCT Appln. No. PCT/EP2017/054754 filed Mar. 1, 2017, which claims priority to German Application No. 10 2016 204 651.9 filed Mar. 21, 2016, the disclosures of which are incorporated in their entirety by reference herein.

BACKGROUND OF THE INVENTION

1. Field of the Invention

The present invention relates to the use of at least one pinch fitting comprising a pinch-fitting sleeve for controlling or stopping a flow of particulate polysilicon, to a fluidized bed reactor plant for production of granular polysilicon, in which at least one pinch fitting of this kind is used, and to a process for producing granular polysilicon using such a pinch fitting.

2. Description of the Related Art

Granular polysilicon (granules of polycrystalline silicon) is an alternative to polysilicon produced by the Siemens process. While the polysilicon in the Siemens process is obtained in the form of a cylindrical silicon rod, which, prior to further processing thereof, has to be comminuted in a time-consuming and costly manner to give what is called chip poly and may again need to be cleaned, granular polysilicon has bulk material properties and can be used directly as raw material, for example for single-crystal production for the photovoltaics and electronics industry. Granular polysilicon is produced in a fluidized bed reactor. This is accomplished by fluidization of silicon particles (polysilicon seed particles) by means of a gas flow in a fluidized bed, the latter being heated to high temperatures (about 600° C. to 1200° C.) by means of a heating apparatus. Addition of a silicon-containing reaction gas results in a pyrolysis reaction at the hot particle surface. Elemental silicon precipitates out on the seed particles, and the individual particles grow in diameter (granular polysilicon particles). The regular removal of grown particles and addition of small silicon particles as seed particles allows continuous operation of the process. Suitable silicon-containing reactant gases are silicon-halogen compounds (e.g. chlorosilanes or bromosilanes), monosilane ($SiH_4$), and mixtures of these gases with hydrogen. Processes and apparatuses of this kind are known, for example, from U.S. Pat. No. 4,786,477 A, EP 1 990 314 A2, WO 2014 177377 A2, WO 2014 180693 A1, WO 2014 191274 A1, WO 2015 104127 A1 and WO 2015 140028 A1.

In the production of granular polysilicon by the fluidized bed process, the polysilicon seed particles and the target product (granular polysilicon) are generally present in reservoir vessels separated from the fluidized bed reactor, which are connected thereto as required. In the case of continuous operation, the seed particles are metered in from reservoir vessels that have to be replenished at regular time intervals. The collecting vessels for the finished target product also have to be emptied at regular time intervals. For filling/emptying of the reaction space, both types of vessel have to be separated from the reaction atmosphere in a gas- and solids-tight manner by means of shutoff valves. This purpose is typically served by shutoff or control valves.

Shutoff valves that provide gas-tight sealing may be solids-compatible ball valves as described, for example, in DE 199 49 577 A1, or slide gate valves as described, for example, in EP 2 270 371 A2. It is also possible to achieve a suitable isolation by combination of a valve that provides non-gas-tight sealing with one downstream that provides gas-tight sealing, in which case the valve that provides non-gas-tight sealing first stops the flow of solids upstream of the valve that provides gas-tight sealing. In the aforementioned solutions, however, the difficulty is in actually achieving gas-tight stoppage with minimum contamination over a multitude of switching operations.

In order to produce high-purity polycrystalline granular silicon, it is additionally necessary not just for the feedstocks to have high purity, but also for the components used for operation of the fluidized bed reactor to be manufactured from materials that do not release any impurities at all to feedstocks and granules.

US 2015 0104369 A1 describes, for example, microcellular polyurethane (PU) as protective layer in flexible tubes and hoses that are in contact with the reaction space in the production of granular polysilicon. The microcellular PU is used here as protective layer for protection against metallic contamination by the pipeline surfaces. However, studies have shown that PU has low chemical stability toward chlorosilanes. The use limit for microcellular PU is therefore 200° C. Positions closer to the reactor are thus not possible without thermal damage to the material.

The particular properties of the granular polysilicon (high abrasiveness, high hardness, high purity) and the demands on the production process (risk of contamination, high temperature) are therefore associated with particular properties of the shutoff valves selected. The shutoff valve in contact with product or media must ideally transfer barely any impurities, if any, to the silicon, has to be chemically stable in the atmosphere used, and has to be able to provide permanent gas-tight sealing with flow of solids in the passage.

SUMMARY OF THE INVENTION

It was thus an object of the present invention to provide suitable shutoff or control valves suitable for use in the control and/or stoppage of a flow of particulate polysilicon, especially for use in a fluidized bed reactor plant for production of granular silicon. The shutoff or control valve should be able to control and/or stop the polysilicon flow in a preferably permanent gas-tight and low-contamination manner, have a long lifetime, be chemically and thermally stable, and be able to withstand the high hardness and abrasiveness of the polysilicon. It has been found that, surprisingly, pinch fittings having pinch-fitting sleeves made of ethylene-propylene-diene rubber and/or a fluorinated elastomer are particularly suitable for this purpose.

DETAILED DESCRIPTION OF THE PREFERRED EMBODIMENTS

Figure 1:
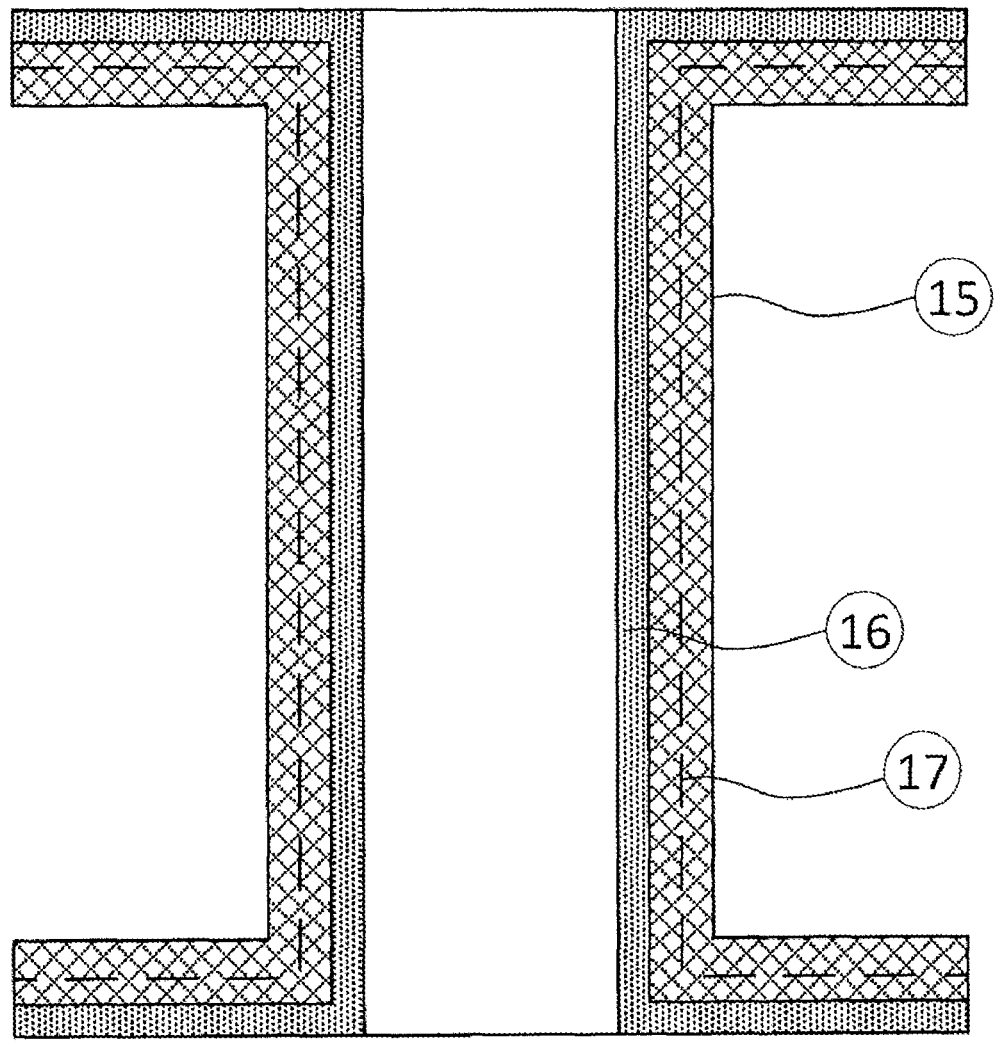
FIG. 1 shows a pinch-fitting sleeve having a two-layer construction.

The present invention relates to the use of at least one pinch fitting comprising a pinch-fitting sleeve for controlling and/or stopping of a flow of particulate polysilicon, characterized in that the pinch-fitting sleeve comprises an elastomer selected from the group consisting of ethylene-propylene-diene rubber, fluorinated elastomer and a combination of ethylene-propylene-diene rubber and fluorinated elastomer.

A pinch fitting, also called a tube constriction valve or tube constriction fitting, generally consists of a round or elliptical (usually metallic) housing and a specifically manufactured highly elastic elastomer tube piece—the pinch-fitting sleeve—which is centered in the middle of the housing and is secured at each of the two ends, for example, with the aid of two flanges or muffs. The stream of solid particles flows through the pinch-fitting sleeve.

Between the housing and the pinch-fitting sleeve, there is typically what is called a control/function space, by means of which the pinch-fitting sleeve can be deformed, for example by pneumatic, hydraulic or mechanical means, in order to constrict the cross section and to stop or to control the flow of solid particles. If the system is relaxed, the pinch-fitting sleeve opens again and the solid particles can flow through the pinch-fitting sleeve over the entire cross section.

Tube constriction valves have already been tried and tested in other fields of industry, such as the food industry, water treatment technology inter alia, for shutting-off abrasive, corrosive and fibrous products. Customary elastomers that are typically used in tube constriction valves are, for example, SBR (styrene-butadiene rubber), EPDM (ethylene-propylene-diene rubber), NR (natural rubber), NBR (nitrile-butadiene rubber), CSM (chlorosulfonated polyethylene), CR (chloroprene rubber), IIR (isobutene-isoprene rubber), FKM (fluoro rubber), BR (butadiene rubber), PUR (polyurethanes) or SI (silicones). Various modifications of the aforementioned elastomers are supplied by various commercial manufacturers for adjustment of particular properties. The wide range of possible variation in the chemical composition of the elastomer to influence the mechanical, physical, chemical and qualitative properties forms the basis for the sleeves specially developed for granular polysilicon according to the present invention.

According to the present invention, the pinch-fitting sleeve comprises an elastomer selected from the group consisting of ethylene-propylene-diene rubber (EPDM), fluorinated elastomer and a combination of ethylene-propylene-diene rubber and fluorinated elastomer. Preferably, the pinch-fitting sleeve consists exclusively of ethylene-propylene-diene rubber, fluorinated elastomer or a combination of ethylene-propylene-diene rubber and fluorinated elastomer and optionally one or more reinforcing weave inlays and optionally adhesion promoters (for example in the case of a multilayer construction of the pinch-fitting sleeve).

The fluorinated elastomer is an elastic polymer which is prepared from at least one fluorinated monomer. Fluorinated monomers are, for example, vinylidene fluoride, hexafluoropropylene, tetrafluoroethylene and perfluoro methyl vinyl ether. The fluorinated elastomers may be polymers of one or more fluorinated monomers with one or more non-fluorinated monomers, for example propene or ethene. Suitable fluorinated elastomers are fluoro rubber (FKM), perfluoro rubber (FFKM), tetrafluoro-ethylene/propylene rubber (FEPM) and fluorinated silicone rubber. The fluorinated elastomer is preferably FKM or FFKM.

It has been found that ethylene-propylene-diene rubber and fluorinated elastomers, by comparison with other sleeve materials, have optimized properties with regard to abrasion resistance, risk of contamination, and thermal and chemical stability to the reactants, products and offgases that occur in the production of granular polysilicon. The very good chemical stability of EPDM and fluorinated elastomers, specifically toward the substances monosilane, chlorosilanes, HCl and hydrogen that are formed/used in the production of granular polysilicon, makes it possible to employ them in the immediate environment of the fluidized bed reactor.

With regard to the lifetime of the pinch-fitting sleeve, the pinch fitting is preferably used at points with the least possible thermal stress. Preferably, the pinch fitting is used at a temperature of 0° C. to 100° C., more preferably at a temperature of 15° C. to 90° C., most preferably at a temperature of 20° C. to 80° C.

Particularly the fluorinated elastomers show high thermal stability. Specifically FFKM can be used at temperatures up to 320° C. and briefly even up to 360° C. Positions relatively close to the reactor are thus possible without thermal damage to the elastomer. Pinch fittings with pinch-fitting sleeves made of fluorinated elastomer, especially FFKM, can thus be used at a temperature of up to 320° C., preferably of 200° C. to 320° C., more preferably at a temperature of 220° C. to 300° C., most preferably at a temperature of 250° C. to 290° C.

Preferably, the elastomer of the pinch-fitting sleeve contains less than 1 mg of boron, less than 20 mg of phosphorus and less than 1 mg of arsenic, based on 1 kg of elastomer.

In addition, the elastomer contains preferably less than 200 mg of aluminum, less than 200 mg of magnesium and less than 100 mg of zinc, based on 1 kg of elastomer.

The elastomer preferably has a total metal content of less than 10,000 mg, more preferably less than 5000 mg, based on 1 kg of elastomer. The total metal content includes not only the abovementioned Mg, Al and Zn but also Ba, Be, Bi, Ca, Cd, Co, Cr, Cu, Fe, K, Li, Mn, Mo, Na, Ni, Pb, Pt, Sb, Sr, Ti, V, Zr and W.

Elastomers of corresponding purity are commercially available from various suppliers.

The metallic impurities are determined by means of axial ICP (inductively coupled plasma) emission spectrometry. For this purpose, the samples are digested under acidic conditions in a microwave ($HF/HNO_3/H_2O_2$). The ICP-OES determination is guided by ISO 11885 "Wasserbeschaffenheit—Bestimmung von ausgewählten Elementen durch induktiv gekoppelte Plasma-Atom-Emissionsspektrometrie [Water quality—Determination of selected elements by inductively coupled plasma optical emission spectrometry] (ICP-OES) (ISO 11885:2007); German version EN ISO 11885:2009", using an HF-resistant sample introduction system made of PFA (perfluoroalkoxy polymer).

The add-on (contamination) effect on the purity of the granular polysilicon produced can be reduced by a factor of four, for example, by the inventive use of the above-described pinch-fitting sleeves by comparison with customary sleeves made of NBR.

For qualitative assessment of contamination, the granular polysilicon is contacted with the materials to be tested and, thereafter, tested by means of standard test methods for physical and chemical analysis of polysilicon. This is done by firstly pulling a test crystal (monocrystal), from which a sample is sawn out in the form of a wafer, polished and cooled with liquid helium. This sample is analyzed by means of photoluminescence spectroscopy for the elements boron, phosphorus, aluminum and arsenic. Secondly, the granules are measured directly for metals by means of ICP as described above.

The use of the novel elastomers in the pinch-fitting sleeves more than doubled the average service life of the fittings by comparison with pinch fittings made from other customary elastomers, for example NBR. "Service life" is understood to mean the period of time from the installation of the fitting until the events-driven deinstallation of the fitting. An event may be, for example, a defective sleeve or some other malfunction. Preferably, the service life of the pinch fitting is 1 year or more.

The lifetime of sleeves is characterized by the number of switching cycles which can be conducted without occurrence of damage to the sleeve. The number of switching cycles of the sleeve is preferably 50,000 or more.

The greater the solids content of the media flow to be shut off in the closing operation, logically, the greater the mechanical stress on the sleeve material will be. The most extreme case of stress is considered to be the closing of the sleeve into a column of granular polysilicon solids. Specifically in this case of use, no cracks form in the pinch region in the case of the above-described sleeves of EPDM and/or fluorinated elastomer, by comparison with other materials. Cracking can be observed, for example, by endoscopy with the fitting installed.

A further important aspect in the selection of the elastomer for pinch-fitting sleeves is the permeation characteristics of gases through the elastomer. The diffusion volume through the elastomer sleeve can be ascertained as an estimate with the following permeation formula (1):

$$\dot{V}_{12} = P \times \frac{A}{s} \times (p_1 - p_2) \quad (1)$$

$\dot{V}_{12}$ gas volume flow rate of the gas diffusing through the permeation area [m$^3$ (STP)/s]
P: permeation coefficient [m$^2$/s×bar]
A: area of the plate [m$^2$]
s: thickness of the area [m]
p$_1$, p$_2$: partial pressures [bar]
t: time [s]

The permeation coefficients of various elastomers for nitrogen and hydrogen are known in the prior art. Reference is made here, for example, to the following literature reference: KGK Kautschuk Gummi Kunststoffe, volume 55, no. 6/2002; Technoprofil TP Blau GmbH, September 2013 edition.

Table 1 below shows, for example, the permeation coefficients of NR, CR and NBR.

TABLE 1

Permeation coefficient P at 25° C. in 10$^{-10}$ [m$^2$/sbar]

| | Gas | |
| --- | --- | --- |
| | N$_2$ | H$_2$ |
| Natural rubber | 0.07-0.19 | 0.19-0.68 |
| CR | 0.01-0.02 | 0.13-0.46 |
| NBR | 0.02 | 0.15 |

The permeation coefficient of EPDM for nitrogen at room temperature (25° C.) is up to 8 times higher than that of NBR. For FKM, however, the permeation coefficient for nitrogen at room temperature is only about half that of NBR. The best results with regard to diffusion resistance are therefore given by a sleeve comprising FKM, preferably consisting exclusively of FKM. Diffusion resistance can be tested, for example, by means of a manometer mounted on the housing of the pinch fitting, since the positive housing pressure builds up more quickly at an elevated diffusion rate.

The pinch-fitting sleeve may have a single-layer or multilayer construction, preferably a two-layer construction. To increase the diffusion resistance, EPDM and fluorinated elastomer can be combined. A particularly preferred embodiment has been found to be a combination of EPDM as core material (outer layer) and FKM as cover layer (inner layer).

FIG. 1 shows, by way of example, a pinch-fitting sleeve with a two-layer construction. The inner layer 16 (shell) of the sleeve in contact with product has preferably been manufactured from FKM; the outer layer 15 (core) preferably consists of EPDM. In addition, one or more reinforcing weaves 17 can optionally be incorporated into the outer layer. The core of the sleeve in conjunction with the weave gives the requisite mechanical stability to the sleeve. The shell improves abrasion resistance and diffusion resistance and reduces product contamination. The optional weave inlays in the pinch-fitting sleeve serve inter alia for compressive strength and optimal function of a sleeve and the service life thereof. Adhesion between the two elastomers (for example through use of an adhesion promoter) should preferably be designed for 50,000 or more switching cycles.

As well as the optimization of the diffusion resistance, a multilayer construction of the sleeve additionally offers the possibility of recognition of wear. By virtue of the specific components of the elastomers, via trace analysis of the granular polysilicon for the master elements of the elastomer, it is possible to detect damage or wear to the top layer.

By comparison with a multilayer construction, a single-layer construction is supported by the fact that the adhesion promoter between the different elastomers is dispensed with. This usually gives rise to lower manufacturing complexity and hence less costly manufacturing.

The size and shape parameters (particle size distribution, particle shape, etc.) of the polysilicon particles are determined by means of dynamic image analysis (DIA) according to ISO 13322-2 (measurement range: 30 μm-30 mm, type of analysis: dry measurement of powders and granules). The average diameter of the seed particles is preferably at least 400 μm. The polycrystalline granular silicon preferably comprises particles having particle sizes of 150 μm to 10,000 μm. The mass-based median value of the particle size distribution in the granular silicon is preferably 850 μm to 2000 μm.

The above-described pinch fittings with pinch-fitting sleeves are therefore preferably used for controlling and/or stopping a flow of polysilicon having an average particle size of 100 μm to 5000 μm, more preferably of 150 μm to 2000 μm, most preferably of 200 μm to 1000 μm.

Preference is given to using pinch fittings having a nominal width of DN 15 to DN 100, preferably of DN 20 to DN 80, especially DN 50.

Pinch fittings having the above-described pinch-fitting sleeves are particularly suitable for use in a fluidized bed reactor plant for production of granular polysilicon. A detailed description of the construction and of the process parameters in the production of granular polysilicon in a fluidized bed reactor are known, for example, from published specifications EP 1 990 314 A2, WO 2014 177377 A2, WO 2014 180693 A1, WO 2014 191274 A1, WO 2015 104127 A1 and WO 2015 140028 A1.

The present invention accordingly also relates to a fluidized bed reactor plant for production of granular polysilicon, comprising
- at least one fluidized bed reactor for the production of granular polysilicon from polysilicon seed particles,
- at least one reservoir vessel for the polysilicon seed particles which is connected via an inlet conduit to the fluidized bed reactor, and
- at least one collecting vessel for the granular polysilicon which is connected via an outlet conduit to the fluidized bed reactor,
- wherein at least one pinch fitting comprising a pinch-fitting sleeve is disposed in the inlet conduit between the reservoir vessel and the fluidized bed reactor and/or in the outlet conduit between the fluidized bed reactor and the collecting vessel,
- wherein the pinch-fitting sleeve comprises an elastomer selected from the group consisting of ethylene-propylene-diene rubber, fluorinated elastomer and a combination of ethylene-propylene-diene rubber and fluorinated elastomer.

Preferably, the fluidized bed reactor plant additionally comprises at least one metering unit disposed in the inlet conduit between the reservoir vessel and the fluidized bed reactor and/or in the outlet conduit between the fluidized bed reactor and the collecting vessel. The pinch fitting here is preferably disposed in the inlet conduit or in the outlet conduit between the metering unit and the fluidized bed reactor.

Preferably, a pinch-fitting sleeve is used in the embodiments described above as preferred in the fluidized bed reactor plant.

Figure 2:
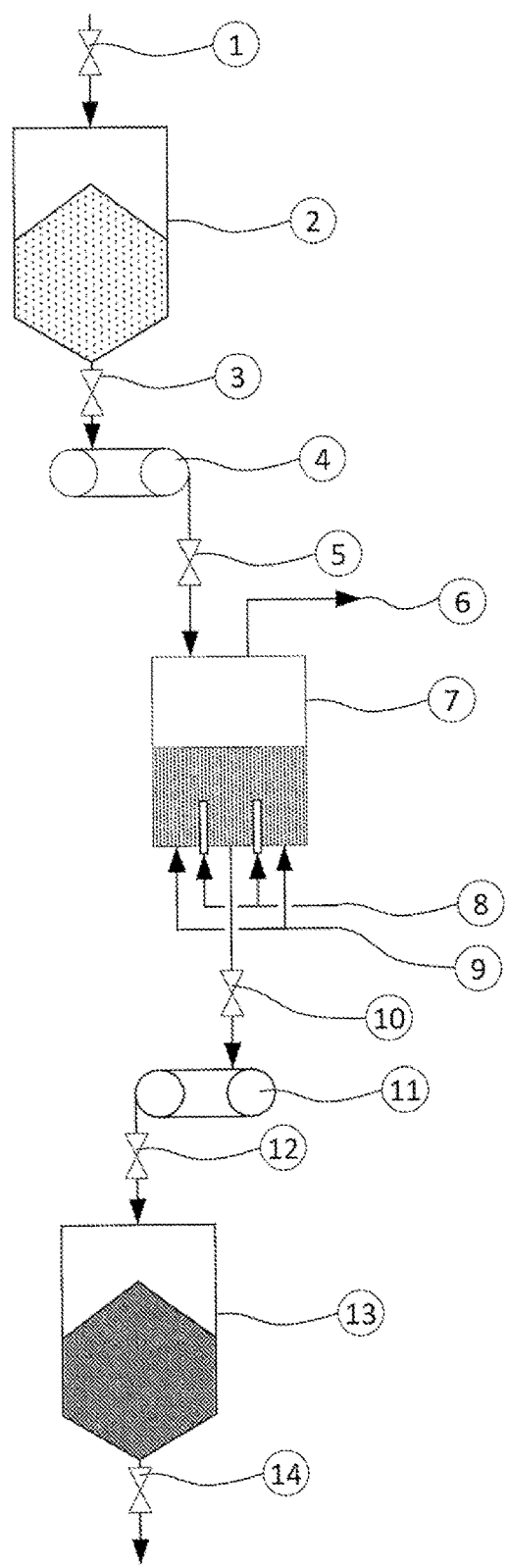
FIG. 2 shows the construction of a fluidized bed reactor plant for production of granular polysilicon using pinch fittings.

FIG. 2 shows, by way of example, a fluidized bed reactor with seed particle addition and product removal. The seed particles are fed to the reservoir vessel 2 via the pinch fitting 1 and to the metering unit 4 via the pinch fitting 3. The pinch fitting 5 is mounted close to the fluidized bed reactor 7 and is therefore preferably equipped with a sleeve of a fluorinated elastomer, for example FKM, in order to withstand the high operating temperature over a prolonged period. The fluidized bed reactor 7 is further equipped with two nozzles for feeding-in the process gas 8, two feeds for the fluidization gas 9, an offgas orifice for removing the process offgases 6 from the reactor and a removal orifice for the finished granular silicon particles at the base of the reactor. The particle removal can be interrupted by means of pinch fitting 10, which, being a fitting close to the reactor, has preferably been equipped with a sleeve of a fluorinated elastomer, for example FKM. By means of metering unit 11, the particles are withdrawn from the reactor 7 in a controlled manner and fed to the downstream collecting vessel 13. To empty the vessel 13, the fitting 12 is closed and the pinch fitting 14 is opened.

The present invention further relates to a process for producing granular polysilicon, comprising
- providing polysilicon seed particles in at least one reservoir vessel,
- feeding the polysilicon seed particles into at least one fluidized bed reactor for production of granular polysilicon,
- discharging the granular polysilicon into at least one collecting vessel,
- characterized in that the stream of polysilicon seed particles and/or of the granular polysilicon in the feeding and/or discharging is controlled and/or stopped by at least one pinch fitting comprising a pinch-fitting sleeve,
- wherein the pinch-fitting sleeve comprises an elastomer selected from the group consisting of ethylene-propylene-diene rubber, fluorinated elastomer and a combination of ethylene-propylene-diene rubber and fluorinated elastomer.

Preference is given here to using a pinch-fitting sleeve in the embodiments described above as preferred.

In addition, the granular polysilicon is preferably produced in the above-described fluidized bed reactor plant, more preferably in a fluidized bed reactor plant in the embodiments described above as preferred.

EXAMPLES

In order to ascertain pinch-fitting sleeve materials suitable for granular polysilicon production, various materials were tested for their physical and chemical properties.

In order to ascertain abrasion resistance, for example, the elastomers NBR, FKM and EPDM were tested in a standardized test method as to how much carbon they transfer to the surface of the granules. The contamination with carbon is determined by means of an automatic analyzer. This is described in detail in US 2013/0216466 A1 in paragraphs [0108] to [0158] and in DE 10 2012 202 640 A1 in paragraphs [0097] to [0147].

In a second test, material samples were stored in a process gas atmosphere consisting of chlorosilanes, HCl and hydrogen at a temperature of 80° C. over a period of 72 hours and then tested for their chemical stability. More particularly, what was tested was whether the material has changed its properties, for example swells, shrinks, becomes brittle or breaks down.

The results of the experiments are shown in table 2:

TABLE 2

| | Comparative experiments | | | |
|---|---|---|---|---|
| | 1 | 2 | 3 | 4 |
| Sleeve material | NBR | FKM | EPDM | Reference |
| Surface C in ppmw | 3 to 5 | 0.5 to 1 | 1.5 to 2 | 0.05 to 0.3 |
| Chemical stability | limited | very good | good | — |

It has been found that, surprisingly, the utilization of FKM and EPDM as sleeve material led to lower contamination of the reference sample than NBR. In addition, FKM and EPDM showed good to very good chemical stability with respect to the gases that occur in the granular polysilicon production.

The invention claimed is:

1. A method for controlling and/or stopping of a flow of particulate polysilicon having a mean particle size of 150 μm to 10,000 μm, measured by means of dynamic image analysis according to ISO 13322-2, measurement range: 30 μm-30 mm, type of analysis: dry measurement of powders and granules,
Comprising controlling and/or stopping the flow by actuating at least one pinch fitting comprising a pinch-fitting sleeve wherein the pinch-fitting sleeve comprises an elastomer selected from the group consisting of ethylene-propylene-diene rubber, fluorinated elastomer, and a combination of ethylene-propylene-diene rubber and fluorinated elastomer.

2. The method of claim 1, wherein the fluorinated elastomer is a fluoro rubber or a perfluoro rubber.

3. The method of claim 1, wherein the pinch-fitting sleeve comprises an inner layer of fluoro rubber and an outer layer of ethylene-propylene-diene rubber.

4. The method of claim 3, wherein a reinforcing weave is incorporated into the outer layer of the pinch fitting sleeve.

5. The method of claim 1, wherein the elastomer contains less than 1 mg of boron, less than 20 mg of phosphorus and less than 1 mg of arsenic, based on 1 kg of elastomer.

6. The method of claim 1, wherein the elastomer contains less than 200 mg of aluminum, less than 200 mg of magnesium and less than 100 mg of zinc, based on 1 kg of elastomer.

7. A fluidized bed reactor for production of a granular polysilicon product, comprising:
   a) at least one fluidized bed reactor for the production of granular polysilicon from polysilicon seed particles,
   b) at least one reservoir vessel for the polysilicon seed particles which is connected to the fluidized bed reactor via an inlet conduit, and
   c) at least one collecting vessel for the granular polysilicon which is connected to the fluidized bed reactor via an outlet conduit,
   wherein at least one pinch fitting comprising a pinch-fitting sleeve is disposed in the inlet conduit between the reservoir vessel and the fluidized bed reactor and/or in the outlet conduit between the fluidized bed reactor and the collecting vessel,
   wherein the pinch-fitting sleeve comprises an elastomer selected from the group consisting of ethylene-propylene-diene rubber, fluorinated elastomer, and a combination of ethylene-propylene-diene rubber and fluorinated elastomer.

8. The fluidized bed reactor of claim 7, wherein the fluidized bed reactor further comprises at least one metering unit disposed in the inlet conduit between the reservoir vessel and the fluidized bed reactor and/or in the outlet conduit between the fluidized bed reactor and the collecting vessel.

9. The fluidized bed reactor of claim 8, wherein the pinch fitting is disposed in the inlet conduit and/or in the outlet conduit between the metering unit and the fluidized bed reactor.

10. The fluidized bed reactor of claim 7, wherein the fluorinated elastomer of the pinch-fitting sleeve is a fluoro rubber or a perfluoro rubber.

11. The fluidized bed reactor of claim 7, wherein the pinch-fitting sleeve comprises an inner layer of fluoro rubber and an outer layer of ethylene-propylene-diene rubber.

12. The fluidized bed reactor of claim 11, wherein a reinforcing weave is additionally incorporated into an outer layer of the pinch-fitting sleeve.

13. The fluidized bed reactor claim 7, wherein the elastomer of the pinch-fitting sleeve contains less than 1 mg of boron, less than 20 mg of phosphorus and less than 1 mg of arsenic, based on 1 kg of elastomer.

14. The fluidized bed reactor claim 7, wherein the elastomer of the pinch-fitting sleeve contains less than 200 mg of aluminum, less than 200 mg of magnesium and less than 100 mg of zinc, based on 1 kg of elastomer.

15. A process for producing granular polysilicon, comprising:
   a) providing polysilicon seed particles in at least one reservoir vessel,
   b) feeding the polysilicon seed particles into at least one fluidized bed reactor for production of granular polysilicon,
   c) discharging the granular polysilicon into at least one collecting vessel,
   wherein the flow of polysilicon seed particles and/or of the granular polysilicon in the feeding and/or discharging is controlled and/or stopped by at least one pinch fitting comprising a pinch-fitting sleeve,
   wherein the pinch-fitting sleeve comprises an elastomer selected from the group consisting of ethylene-propylene-diene rubber, fluorinated elastomer, and a combination of ethylene-propylene-diene rubber and fluorinated elastomer.

* * * * *